United States Patent
Lee et al.

(10) Patent No.: US 8,319,865 B2
(45) Date of Patent: Nov. 27, 2012

(54) CAMERA ADJUSTING SYSTEM AND METHOD

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 232 days.

(21) Appl. No.: 12/786,300

(22) Filed: May 24, 2010

(65) Prior Publication Data

US 2011/0187876 A1  Aug. 4, 2011

(30) Foreign Application Priority Data

Feb. 2, 2010  (TW) ............................... 99102939 A

(51) Int. Cl.
  *H04N 9/09* (2006.01)
  *H04N 7/18* (2006.01)
  *G06K 9/00* (2006.01)

(52) U.S. Cl. .......... 348/265; 348/262; 348/77; 348/143; 348/159; 348/161; 382/115; 382/118

(58) Field of Classification Search .......... 348/262–265, 348/77, 143–161; 382/115, 118
See application file for complete search history.

(56) References Cited

U.S. PATENT DOCUMENTS

| | | | |
|---|---|---|---|
| 7,012,637 B1 * | 3/2006 | Blume et al. ............... | 348/218.1 |
| 2001/0031143 A1 * | 10/2001 | Kamon et al. ............... | 396/121 |
| 2002/0093568 A1 * | 7/2002 | Chumbley .................... | 348/207 |
| 2006/0028548 A1 * | 2/2006 | Salivar et al. ................ | 348/143 |
| 2008/0118104 A1 * | 5/2008 | Ariyur et al. ................. | 382/103 |

\* cited by examiner

*Primary Examiner* — Sinh Tran
*Assistant Examiner* — Mark Monk
(74) *Attorney, Agent, or Firm* — Altis Law Group, Inc.

(57) ABSTRACT

A camera adjusting system includes a first camera, a second camera, and a control apparatus. The first camera is movably arranged on a sliding rail to monitor a locale. The second camera captures a three dimensional (3D) image of a head of a subject. The control apparatus receives the captured 3D image of the head of the subject and simulates a corresponding 3D model according to the captured 3D image, and compares the actual 3D model with a reference 3D model, to compute a compared result, and outputs a control signal to the first camera to adjust parameters of the first camera according to the compared result.

13 Claims, 15 Drawing Sheets

CAMERA ADJUSTING SYSTEM AND METHOD

CROSS-REFERENCE

Relevant subject matters are disclosed in three co-pending U.S. patent applications (Application Nos. 12/786,289, 12/786,291, 12/786,293) filed on the same date and having the same title, which are assigned to the same assignee as this patent application.

BACKGROUND

1. Technical Field

The present disclosure relates to a camera adjusting system and a camera adjusting method.

2. Description of Related Art

Pan-tilt-zoom (PTZ) cameras are commonly used in security systems and, generally, are remotely controlled through the use of computers. To aim the camera and/or adjust the focus may require complex commands to be entered with a keyboard of the computer controlling the camera. This may also be slow and inconvenient. Therefore, there is room for improvement in the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
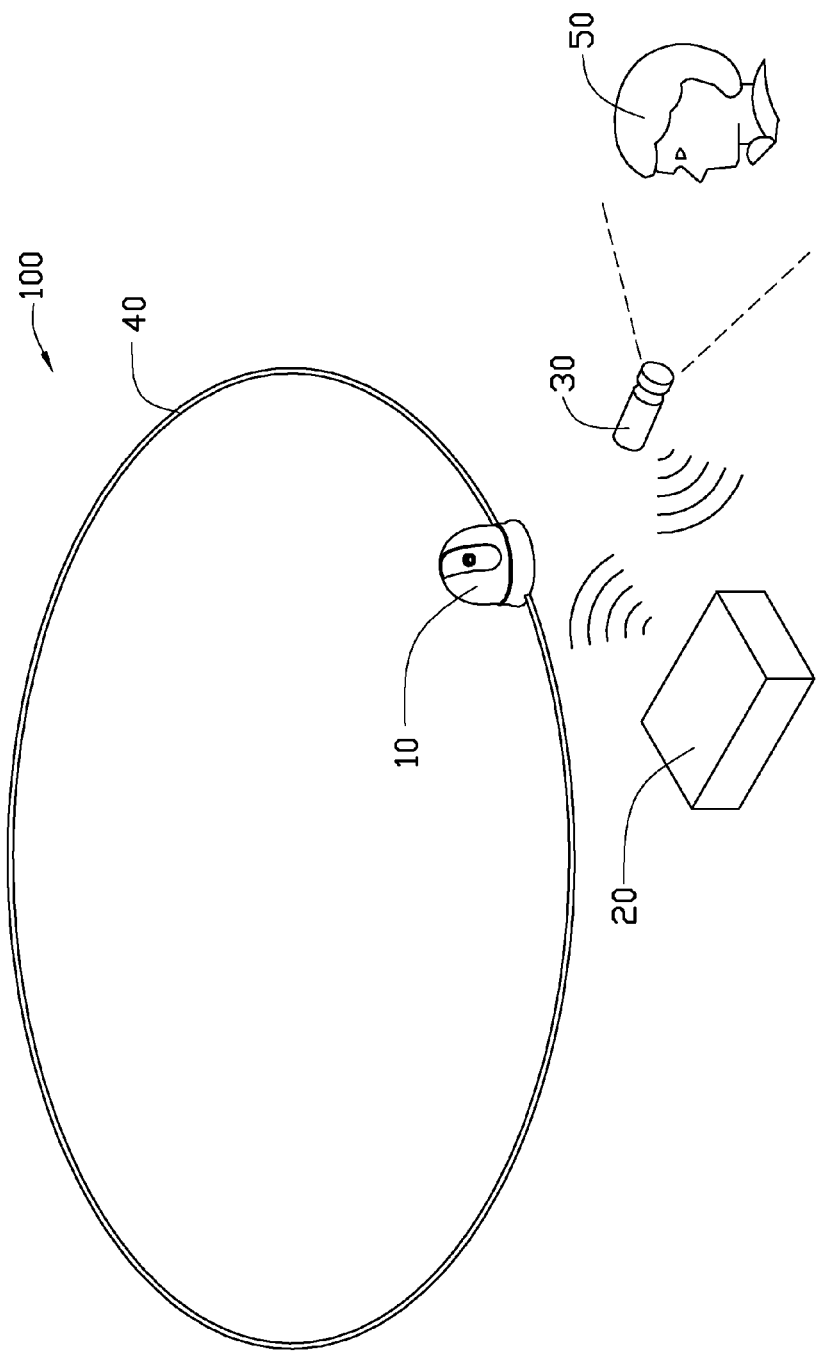
FIG. 1 is a schematic view of an embodiment of a camera adjusting system including a first camera and a control apparatus.

Referring to FIG. 1, an embodiment of a camera adjusting system 100 includes a first camera 10, a control apparatus 20, a second camera 30, and a sliding rail 40. The second camera 30 is a time-of-flight (TOF) camera. In one embodiment, the sliding rail 40 is circular. In other embodiments, the sliding rail 40 can be designed to be other shapes according to requirements.

The first camera 10 is used to monitor a locale such as a house. The second camera 30 is used to capture a three dimensional (3D) image of a head of a subject 50, and send the captured 3D image to the control apparatus 20. The control apparatus 20 receives the captured 3D image, models a corresponding 3D model according to the captured 3D image, and compares the actual 3D model with a reference 3D model, and adjusts the parameters, such as the capturing angles, the positions on the sliding rail 40, and the zoom scales, of the first camera 10, according to a compared result between the actual 3D model and the reference 3D model. The first camera 10 is controlled by the control apparatus 20 to move on the sliding rail 40.

Figure 2:
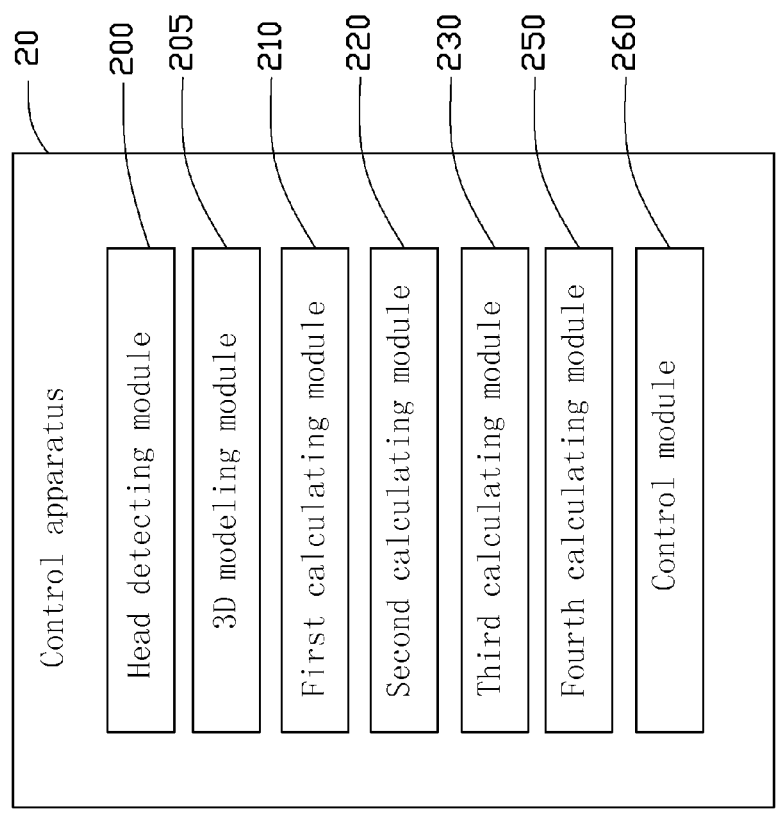
FIG. 2 is a block diagram of a first embodiment of the control apparatus of FIG. 1.

Referring to FIG. 2, a first embodiment of the control apparatus 20 includes a head detecting module 200, a 3D modeling module 205, a first calculating module 210, a second calculating module 220, a third calculating module 230, a fourth calculating module 250, and a control module 260.

The head detecting module 200 is used to receive the captured 3D image of the head of the subject 50 from the second camera 30. In one embodiment, the head detecting module 200 may use the AdaBoost algorithm to detect the captured 3D image.

The 3D modeling module 205 is used to model a corresponding 3D model of the head of the subject 50 according to captured 3D image.

Figure 3:
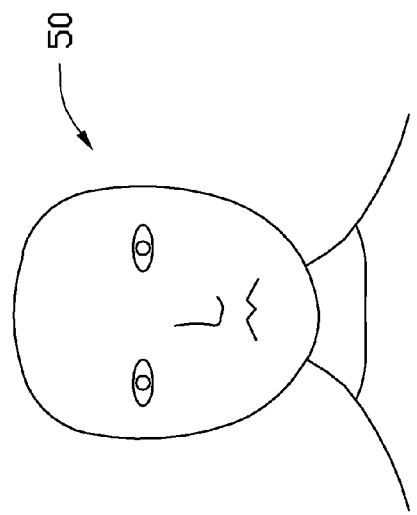
FIG. 3 is a schematic view of a head of a subject.
Figure 3A:
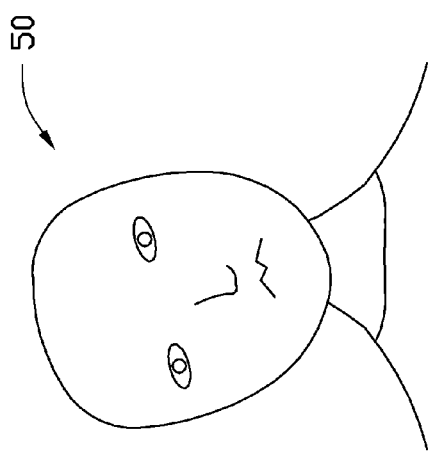
FIGS. 3A and 3B are schematic views of the head of the subject of FIG. 3 tilted right and left, respectively.
Figure 3B:
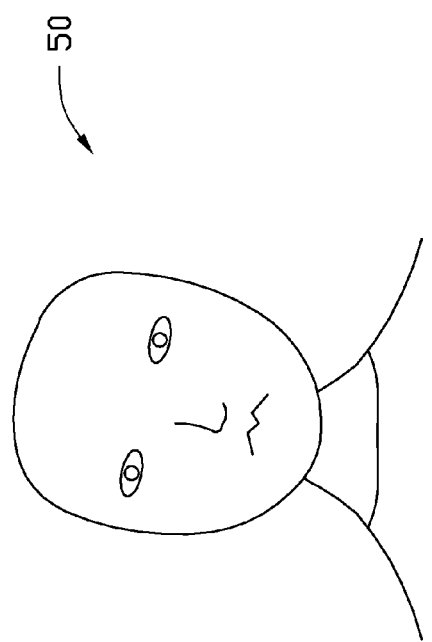

The first calculating module 210 is used to calculate the actual 3D model to compute a tilted angle of the head of the subject 50. In one embodiment, the first calculating module 210 compares a reference 3D model with the actual 3D model, to compute the tilted angle of the head of the subject 50. FIG. 3 shows the reference 3D model of the head of the subject 50, which is straight. FIGS. 3A and 3B show two different tilted angles of the head of the subject 50, one is tilted right and the other is tilted left.

Figure 4A:
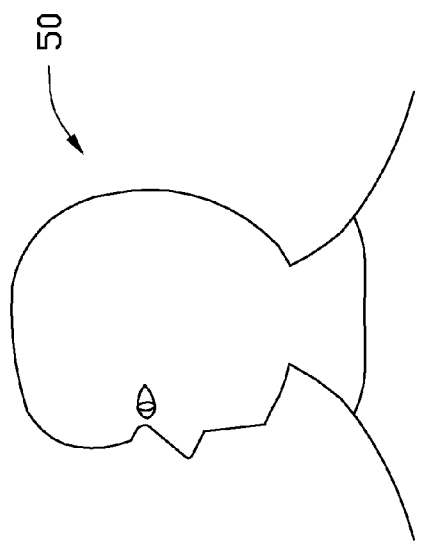
FIGS. 4A and 4B are schematic views of the side of the head of the subject of FIG. 3 turned right and left, respectively.
Figure 4B:
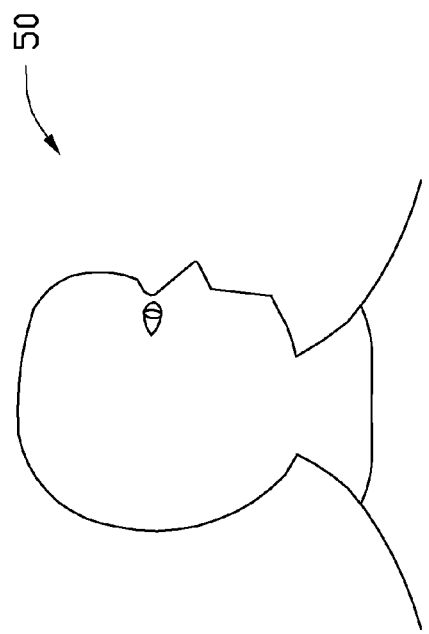

The second calculating module 220 is used to calculate the actual 3D model to compute a turned angle of the head of the subject 50. In one embodiment, the second calculating module 220 compares the reference 3D model of FIG. 3 with the actual 3D model, to compute the turned angle of the head of the subject 50. FIGS. 4A and 4B show two different turned angles of the head of the subject 50, one is turned right and the other is turned left.

Figure 5A:
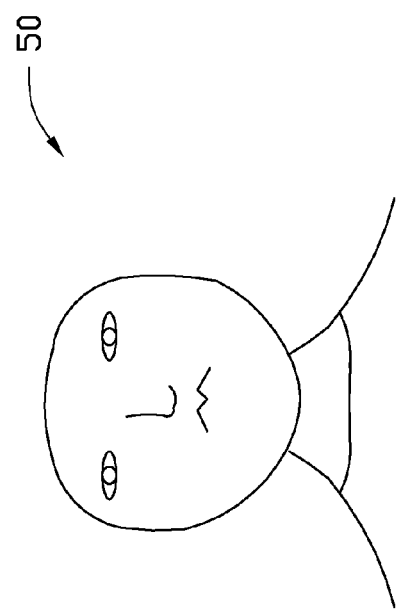
FIGS. 5A and 5B are schematic views of the head of the subject of FIG. 3 raised and lowered, respectively.
Figure 5B:
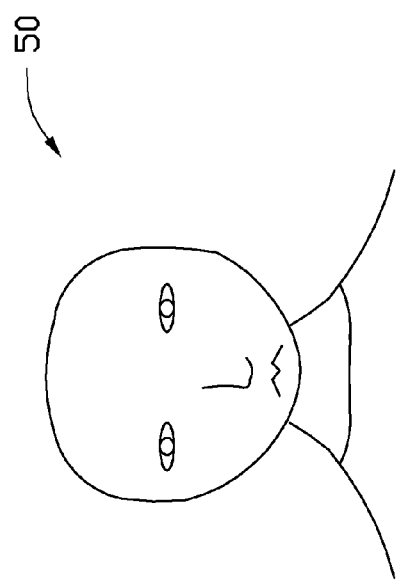

The third calculating module 230 is used to calculate the actual 3D model to compute a raised angle or a lowered angle of the head of the subject 50. In one embodiment, the third calculating module 230 compares the reference 3D model of FIG. 3 with the actual 3D model, to compute the raised or lowered angle of the head of the subject 50. FIGS. 5A and 5B show the head is raised and lowered, respectively.

The fourth calculating module 250 is used to calculate the actual 3D model to compute a distance between the head of the subject 50 and the second camera 30. In one embodiment, the fourth calculating module 250 compares the reference 3D model of FIG. 3 with the actual 3D model, to compute the distance between the head of the subject 50 and the second camera 30. For example, the distance between the head of the subject 50 and the second camera 30 is fifty centimeters when the size ratio of the actual 3D model is the same as the size ratio of the reference 3D model of FIG. 3.

In other embodiments, the control module 20 may further include other calculating modules to get other of characteristics of the head of the subject 50, for example to calculate a number of times the subject 50 blinks their eyes on the actual 3D model.

The control module 260 receives the calculated results of the first to fourth calculating modules 210, 220, 230, and 250, and correspondingly outputs control signals to the first camera 10 to adjust the parameters of the first camera 10. For example, when the first calculating module 210 calculates the head of the subject 50 is tilted right ten degrees, the control module 260 outputs a first control signal to control the first camera 10 to move ten degrees clockwise on the sliding rail 40 correspondingly. When the second calculating module 220 calculates the head of the subject 50 is turned left ten degrees, the control module 260 outputs a second control signal to control the lens of first camera 10 to turn left ten degrees correspondingly. When the third calculating module 230 calculates the head of the subject 50 is raised ten degrees, the control module 260 outputs a third control signal to control the lens of first camera 10 to rotate up ten degrees correspondingly. When the fourth calculating module 250 calculates the distance between the second camera 30 and the head of the subject 50 is reduced by ten centimeters, the control module 260 outputs a fourth control signal to control the focus of the first camera 10 to be shortened correspondingly.

In one embodiment, the first camera 10 includes a driving unit (not shown), the driving unit is used to adjust the parameters of the first camera 10 according to the control signals from the control module 260. In other embodiments, the camera adjusting system 100 further includes a network module (not shown), which is used to transmit the control signals from the control module 260 to the driving unit.

An example explaining the work process of the first to fourth calculating modules 210, 220, 230, and 250 is given in the next paragraph. The second to fourth calculating modules 220, 230, and 250 have a similar work process, therefore, no example will be given.

Figure 6A:
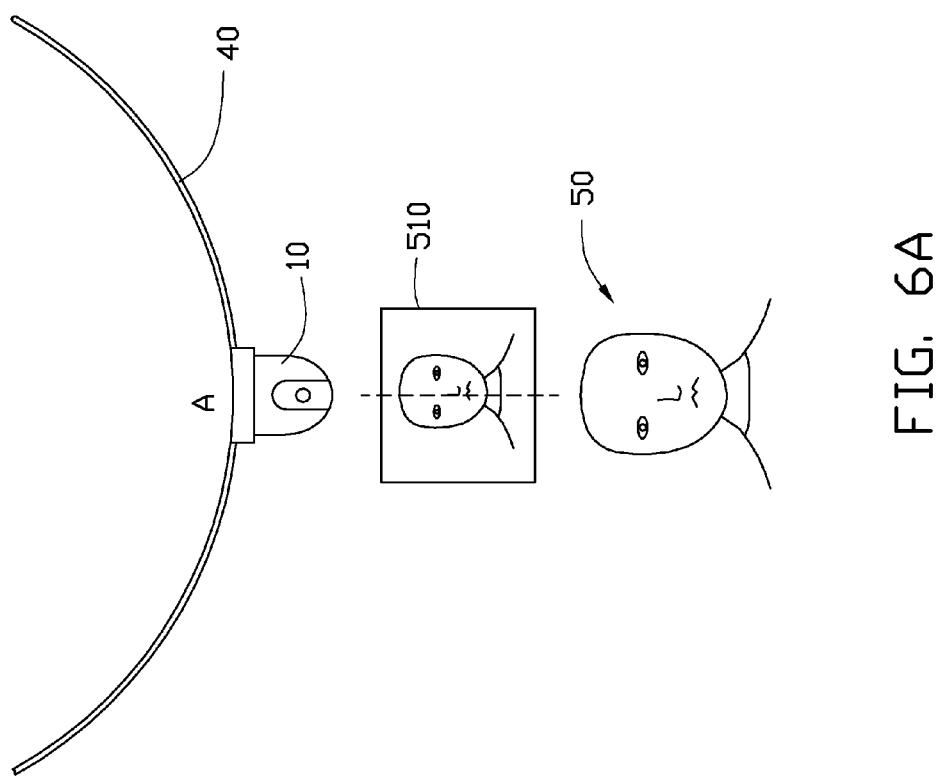
FIGS. 6A-6C are three schematic views of the first camera of FIG. 1 in three different positions, respectively, together with corresponding actual 3D models and the corresponding postures of the head of the subject.
Figure 6B:
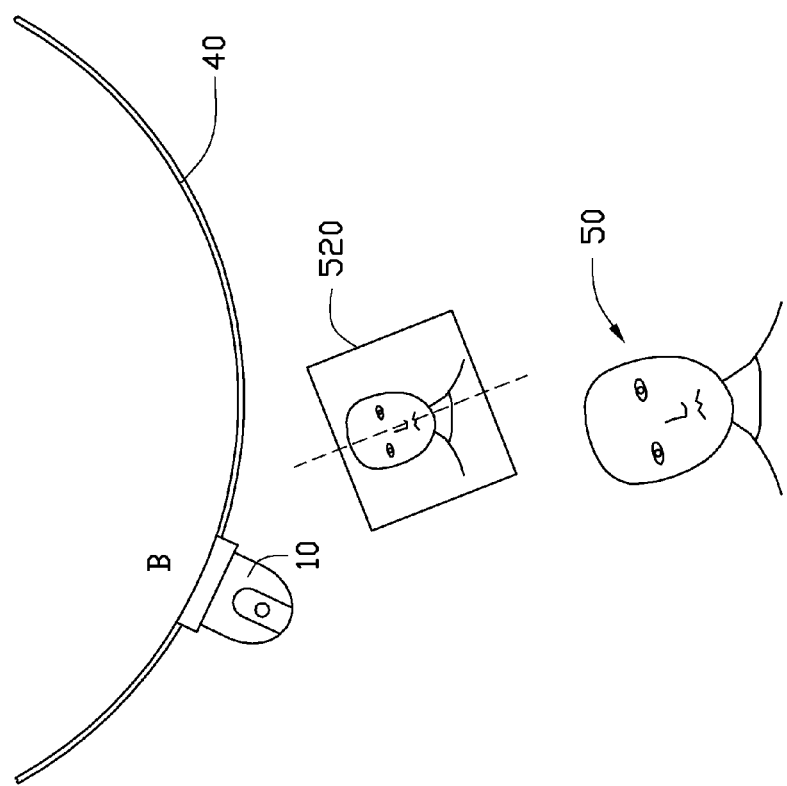
Figure 6C:
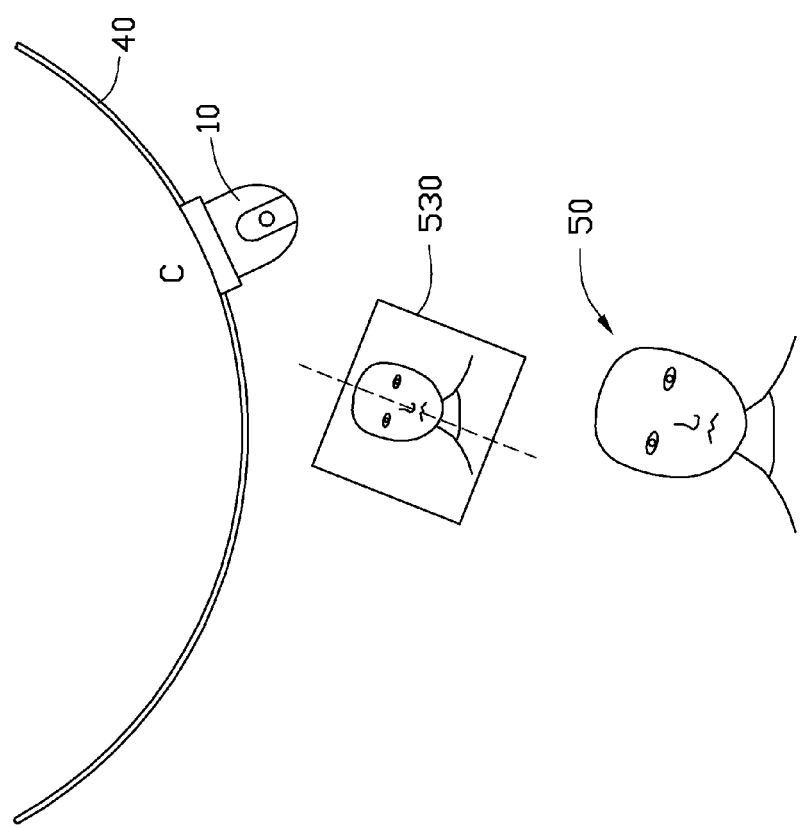

Example, referring to FIG. 6A, the head of the subject 50 directly faces the second camera 30. The second camera 30 captures a 3D image of the head of the subject 50. The control apparatus 20 receives the 3D image through the head detecting module 200, and models a corresponding 3D model 510 through the 3D modeling module 205. Because the 3D model 510 is the same as the reference 3D model, the first camera 10 will not be changed and is still fixed on an original position A of the sliding rail 40. Referring to FIG. 6B, the head of the subject 50 is tilted right about forty-five degrees. The second camera 30 captures a 3D image of the head of the subject 50. The control apparatus 20 receives the 3D image through the head detecting module 200, and models a corresponding 3D model 520 through the 3D modeling module 205. The first calculating module 210 compares the reference 3D model with the actual 3D model 520, to compute the corresponding tilted angle of the head of the subject 50. The control module 260 receives the calculated result and outputs the first control signal to control the first camera 10 to move forty-five degrees clockwise on the sliding rail 40 to a position B of the sliding rail 40 correspondingly. Referring to FIG. 6C, the head of the subject 50 is tilted left forty-five degrees. The second camera 30 captures a 3D image of the head of the subject 50. The control apparatus 20 receives the 3D image through the head detecting module 200, and models a corresponding 3D model 530 through the 3D modeling module 205. The first calculating module 210 compares the reference 3D model with the actual 3D model 530, to compute the corresponding tilted angle of the head of the subject 50. The control module 260 receives the calculated result and outputs the first control signal to control the first camera 10 to move forty-five degrees anticlockwise on the sliding rail 40 to a position C of the sliding rail 40 correspondingly.

Figure 7:
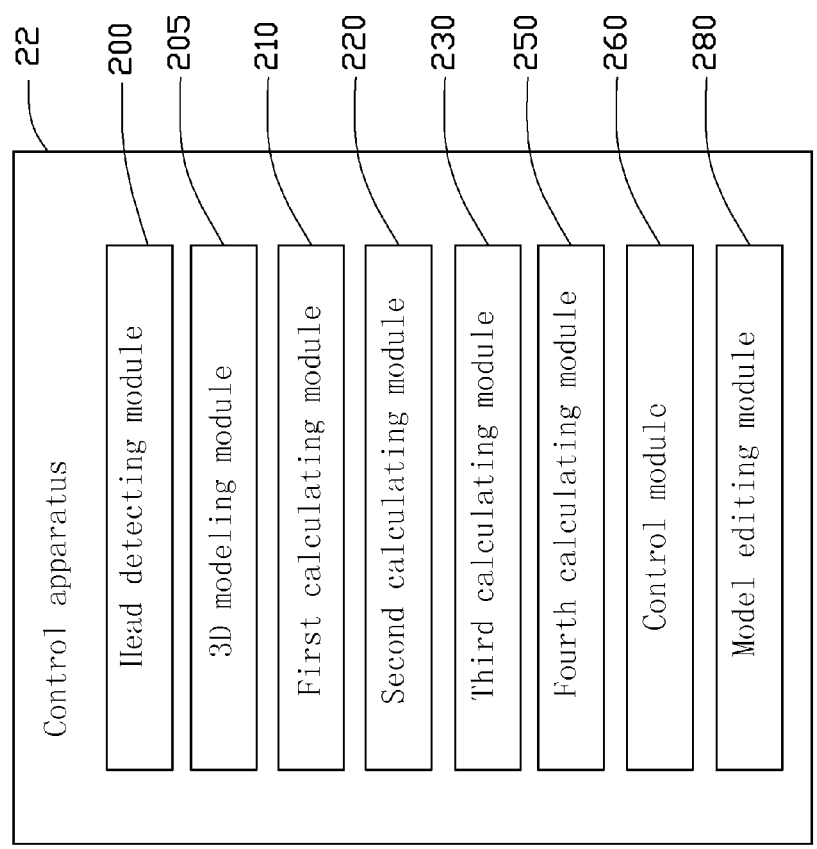
FIG. 7 is a block diagram of a second embodiment of the control apparatus of FIG. 1.

Referring to FIG. 7, a second embodiment of the control apparatus 22 includes a head detecting module 200, a 3D modeling module 205, a first calculating module 210, a second calculating module 220, a third calculating module 230, a fourth calculating module 250, a control module 260, and a model editing module 280. The model editing module 280 is used to edit the 3D model modeled by the 3D modeling module 205 to simplify the 3D model. For example, the model editing module 280 cuts the arms or neck of the 3D model to leave the head of the 3D model only. After editing the 3D model, the calculating processes of the first calculating module 210, the second calculating module 220, the third calculating module 230, and the fourth calculating module 250 can be simpler.

Figure 8:
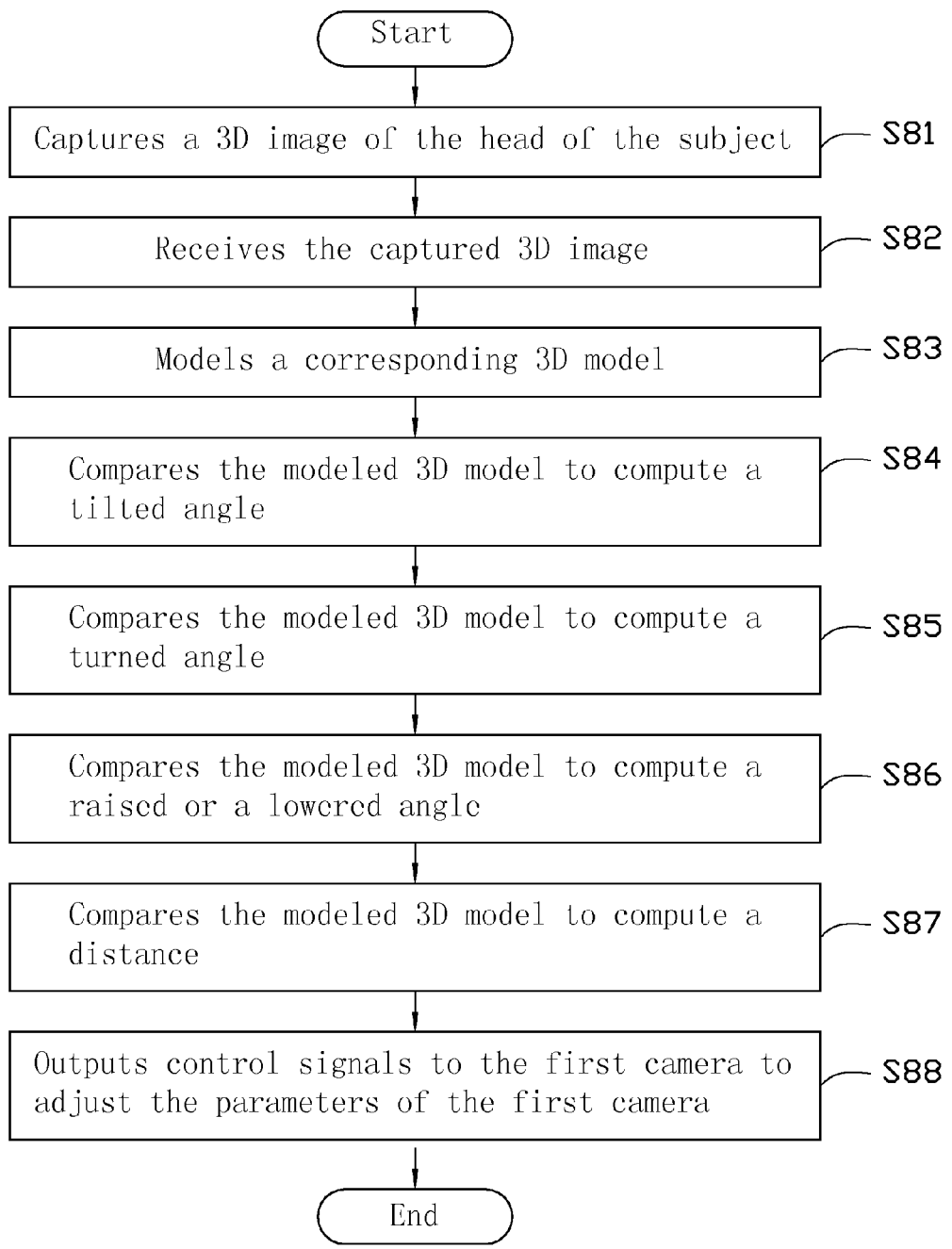
FIG. 8 is a flowchart of a first embodiment of a camera adjusting method.

Referring to FIG. 8, a first embodiment of a camera adjusting method includes the following steps.

In step 81, the second camera 30 captures a 3D image of the head of the subject 50.

In step S82, the head detecting modules 200 receives the captured 3D image from the second camera 30. The head detecting module 200 may use the AdaBoost algorithm to detect the captured 3D image.

In step S83, the 3D modeling module 205 models a corresponding 3D model of the head of the subject 50 according to captured 3D image.

In step S84, the first calculating module 210 compares the actual 3D model with a reference 3D model, to compute a first result of a tilted angle of the head of the subject 50.

In step S85, the second calculating module 220 compares the actual 3D model with the reference 3D model, to compute a second result of a turned angle of the head of the subject 50.

In step S86, the third calculating module 230 compares the actual 3D model with the reference 3D model, to compute a third result of a raised or a lowered angle of the head of the subject 50.

In step S87, the fourth calculating module 250 compares the actual 3D model with the reference 3D model, to compute a fourth result of a distance between the head of the subject 50 and the second camera 30.

In step S88, the control module 260 receives the computed results of the first to fourth calculating modules 210, 220, 230, and 250, and correspondingly outputs control signals to the first camera 10 to adjust the parameters of the first camera 10.

In other embodiments, the four steps of S84, S85, S86, and S87 can be executed in any other order, such as S85 firstly, S87 secondly, S84 thirdly, and S86 lastly.

Figure 9:
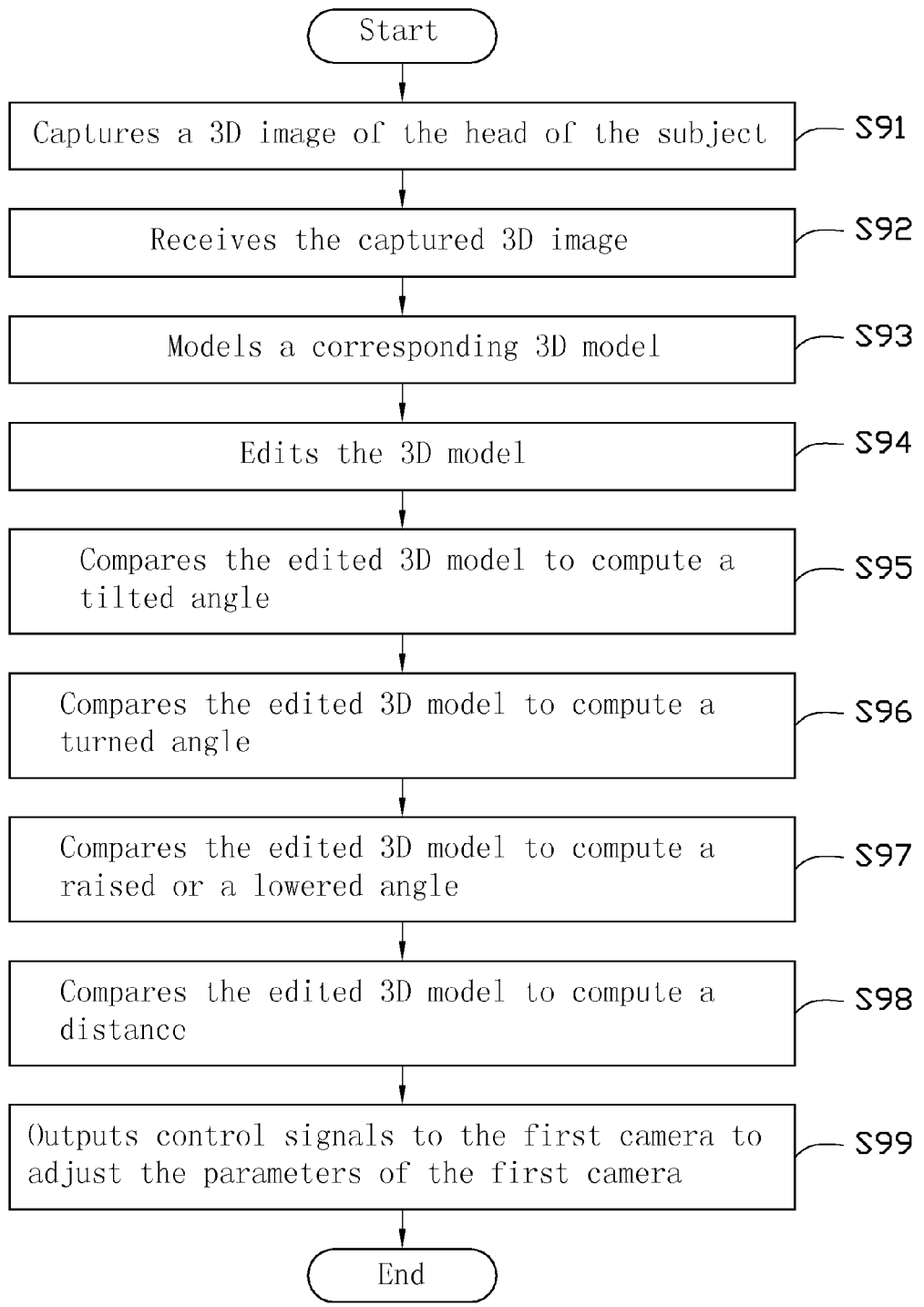
FIG. 9 is a flowchart of a second embodiment of a camera adjusting method.

Referring to FIG. 9, a second embodiment of a camera adjusting method includes the following steps.

In step 91, the second camera 30 captures a 3D image of the head of the subject 50.

In step S92, the head detecting modules 200 receives the captured 3D image from the second camera 30. The head detecting module 200 may use the AdaBoost algorithm to detect the captured 3D image.

In step S93, the 3D modeling module 205 models a 3D model of the head of the subject 50 according to captured 3D image.

In step S94, the model editing module 280 edits the 3D model modeled by the 3D modeling module 205 to simplify the 3D model.

In step S95, the first calculating module 210 compares the edited 3D model with a reference 3D model, to compute a first result of a tilted angle of the head of the subject 50.

In step S96, the second calculating module 220 compares the edited 3D model with the 3D model, to compute a second result of a turned angle of the head of the subject 50.

In step S97, the third calculating module 230 compares the edited 3D model with the reference 3D model, to compute a third result of a raised or a lowered angle of the head of the subject 50.

In step S98, the fourth calculating module 250 compares the edited 3D model with the reference 3D model, to compute a fourth result of a distance between the head of the subject 50 and the second camera 30.

In step S99, the control module 260 receives the computed results of the first to fourth calculating modules 210, 220, 230, and 250, and correspondingly outputs control signals to the first camera 10 to adjust the parameters of the first camera 10.

In other embodiments, the four steps of S95, S96, S97, and S98 can be executed in any other order, such as S98 firstly, S96 secondly, S97 thirdly, and S95 lastly.

The camera adjusting method used in the camera adjusting system 100 can control the first camera 10 according to the action of the head of the subject 50, which is very easily controlled.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A camera adjusting system, comprising:
    a first camera movably mounted on a sliding rail;
    a second camera to capture a three dimensional (3D) image of a head of a subject; wherein the second camera is a time-of-flight (TOF) camera; and
    a control apparatus to receive the captured 3D image of the head of the subject, model a corresponding 3D model according to captured 3D image, and compare the actual 3D model with a reference 3D model to compute a movement of the head of the subject comprising a tilted angle, a turned angle, and a raised or lowered angle of the head of the subject, and output a control signal to the first camera to adjust parameters of the first camera according to the movement of the head of the subject; wherein the parameters of the first camera comprise capturing angles, zoom scales, and positions of the first camera on the sliding rail.

2. The camera adjusting system of claim 1, wherein the control apparatus comprises a head detecting module, a 3D modeling module, a calculating module, and a control module, the head detecting module receives the captured 3D image of the head of the subject, the 3D modeling module models the corresponding 3D model of the head of the subject according to the captured 3D image, the calculating module compares the actual 3D model with the reference 3D model to compute the tilted angle of the head of the subject, the control module outputs the control signal to control the first camera to correspondingly move clockwise or anticlockwise on the sliding rail according to the computed tilted angle.

3. The camera adjusting system of claim 1, wherein the control apparatus comprises a head detecting module, a 3D modeling module, a calculating module, and a control module, the head detecting module receives the 3D image of the head of the subject, the 3D modeling module models the corresponding 3D model of the head of the subject according to captured 3D image, the calculating module compares the actual 3D model with the reference 3D model to compute the turned angle of the head of the subject, the control module outputs the control signal to control a lens of the first camera to correspondingly rotate left or right according to the computed turned angle.

4. The camera adjusting system of claim 1, wherein the control apparatus comprises a head detecting module, a 3D modeling module, a calculating module, and a control module, the head detecting module receives the 3D image of the head of the subject, the 3D modeling module models the corresponding 3D model of the head of the subject according to captured 3D image, the calculating module compares the actual 3D model with the reference 3D model to compute the raised or lowered angle of the head of the subject, the control module outputs the control signal to control a lens of the first camera to correspondingly rotate up or down according to the computed raised or lowered angle.

5. The camera adjusting system of claim 1, wherein the control apparatus comprises a head detecting module, a 3D modeling module, a calculating module, and a control module, the head detecting module receives the 3D image of the head of the subject, the 3D modeling module models the corresponding 3D model of the head of the subject according to captured 3D image, the calculating module compares the actual 3D model with the reference 3D model to compute a distance between the second camera and the head of the subject, the control module outputs the control signal to control the first camera to correspondingly adjust the focus of the first camera according to the computed distance.

6. The camera adjusting system of claim 1, wherein the control apparatus comprises a model editing module to edit the actual 3D model.

7. The camera adjusting system of claim 1, wherein the sliding rail is circular.

8. A camera adjusting method to adjust parameters of a first camera according to a three dimensional (3D) image of a head of a subject captured by a second camera, the first camera movably arranged on a sliding rail, the camera adjusting method comprising:
    capturing a 3D image of the head of the subject by the second camera; wherein the second camera is a time-of-flight (TOF) camera;
    receiving the captured 3D image of the head of the subject from the second camera;
    modeling a corresponding 3D model of the head of the subject according to the captured 3D image;
    comparing the actual 3D model with a reference 3D model to compute a compared result, wherein the compared result comprises a tilted angle, a turned angle, and a raised or lowered angle of the head of the subject; and
    outputting a control signal to the first camera to adjust parameters of the first camera according to the compared result; wherein the parameters of the first camera comprise capturing angles, zoom scales, and positions of the first camera on the sliding rail.

9. The camera adjusting method of claim 8, wherein in the comparing step, when the tilted angle of the head of the subject is computed; and wherein in the outputting step, the control signal controls the first camera to correspondingly move clockwise or anticlockwise on the sliding rail according to the computed tilted angle.

10. The camera adjusting method of claim 8, wherein in the comparing step, when the turned angle of the head of the subject is computed; and wherein in the outputting step, the control signal controls a lens of the first camera to correspondingly rotate left or right according to the computed turned angle.

11. The camera adjusting method of claim 8, wherein in the comparing step, when the raised or lowered angle of the head of the subject is computed; and wherein in the outputting step, the control signal controls the first camera to correspondingly rotate up or down according to the computed raised or lowered angle.

12. The camera adjusting method of claim 8, wherein in the comparing step, comparing the actual 3D model with the reference 3D model computes a distance between the second camera and the head of the subject; and wherein in the outputting step, the control signal controls the focusing of the first camera.

13. The camera adjusting method of claim 8, wherein between the modeling step and the comparing step, further comprises:

editing the actual 3D model.

* * * * *